United States Patent [19]

Secor et al.

[11] 4,391,451

[45] Jul. 5, 1983

[54] EXPANSIBLE CHUCK ASSEMBLY

[75] Inventors: Arthur D. Secor; Jerome G. Secor, both of Toledo, Ohio

[73] Assignee: Great Lakes Industries, Inc., Toledo, Ohio

[21] Appl. No.: 188,109

[22] Filed: Sep. 17, 1980

[51] Int. Cl.³ .................. B23B 31/40; B23B 5/34; B23B 31/10

[52] U.S. Cl. .................................... 279/2 A; 279/4

[58] Field of Search ................ 279/2 A, 2 R, 4; 242/72 R, 72.1; 82/40, 44; 91/4 R, 45 A, 1

[56] References Cited

U.S. PATENT DOCUMENTS

| | | | |
|---|---|---|---|
| 1,420,682 | 6/1922 | Bright | 279/2 |
| 1,509,997 | 9/1924 | Fry | 279/4 X |
| 1,600,367 | 9/1926 | Sczawinski | 279/2 |
| 2,480,762 | 8/1949 | Parker | 279/4 X |
| 2,626,811 | 1/1953 | Hohwart et al. | 279/2 A |
| 2,675,241 | 4/1954 | Petit | 279/2 |
| 2,942,892 | 6/1960 | Nelson | 279/2 |
| 2,949,313 | 8/1960 | Moser et al. | 279/2 A |
| 3,369,464 | 2/1968 | Blattry | 279/4 X |
| 3,641,875 | 2/1972 | Kodalle | 91/1 |
| 3,972,488 | 8/1976 | Lee et al. | 279/2 A |
| 4,093,137 | 6/1978 | Briar et al. | 242/72 R |
| 4,147,312 | 4/1979 | Secor et al. | 279/2 A |

Primary Examiner—Robert E. Garrett
Assistant Examiner—Paul M. Heyrana, Sr.
Attorney, Agent, or Firm—Penrose Lucas Albright

[57] ABSTRACT

An air-mechanical expanding chuck for supporting a core for winding webs. A cylindrical chuck body defines a chamber which contains a piston with its piston rod extending out of the chamber for insertion into the core. The piston rod forms a tapered arbor at its end. Three gripping elements bear against flat surfaces formed on the tapered arbor. By applying air to one side of the piston, the arbor is moved inboard relative to the core and the gripping elements are thereby expanded to engage the core's interior. The chuck body's inward face is provided with radially extending T-grooves to receive corresponding T-formed outer ends of the gripping elements which are movable radially in the T-grooves. The gripping elements are readily removable from the grooves and replaceable by elements of other sizes for different diameter cores. To disengage the gripping elements, compressed air is applied to the inboard side of the piston thereby moving the piston, piston rod and arbor outboard relative to the core whereby the gripping elements are released from the core.

14 Claims, 8 Drawing Figures

EXPANSIBLE CHUCK ASSEMBLY

BACKGROUND OF THE INVENTION

Expansible mandrels and chucks and other similar devices for supporting cores for winding webs such as paper, film, foil, metal sheet coils, textiles and the like are well-known in the prior art. In general, such expansible chucks either use mechanical means for obtaining the expansion or pneumatic means which expands flexible or elastic material to engage the interior of the cores. A variety of mechanical expanding chucks are known. Some use screwthread or nut methods to expand movable elements outwardly to engage the core. Others depend upon tension of the web being wound or unwound to activate cam-type elements which accomplish chuck expansion and engagement of the core. The thread and nut devices usually consume significant time to obtain the desired engagement and are not always dependable because the applied torque may vary from application to application. Further, they may not provide a means to follow and continually bear against the core's interior surface should it stretch or move during winding process.

Mechanical expansible chucks which depend upon web tension to activate cam elements are not always dependable because the web tension varies considerably with various types of material being wound; for example, plastic film frequently requires a light web tension which sometimes proves insufficient to activate the cam mechanism. On the other hand, with materials requiring high web tension, a mechanically expansible chuck may become mechanically jammed whereby its removal from the core can be difficult.

Chucks which use pneumatic means for expansion and engagement generally have an elastic element such as a tire or inflatable tube which causes the engagement components to expand outwardly for securing same within the core. Inasmuch as there is normally about a one-sixteenth inch clearance for chuck insertion into the core, the elastic element tends to expand into space offering the least resistance when charged with compressed air and the chuck is sometimes engaged in an eccentric position. This, in turn, causes vibration during the winding process which, in turn, reduces the speed with which the roll can be wound or unwound.

The use of compressed air to cause mechanical engagement of a chuck assembly with the interior of a core is not unknown. For example, U.S. Pat. No. 3,753,570 to A. S. Espasa discloses a locking head wherein air pressure is utilized to move an actuator which, in turn, causes a locking arm to move outwardly and engages the interior of the core.

U.S. Pat. No. 3,997,176 to J. Wyckoff et al is directed to an expansible mandrel wherein a tapered member is moved by a piston and cylinder assembly to expand a plurality of wedge members surrounded by spacer plates and an elastic member.

The instant inventors have previously disclosed expansible core-shafts which utilize fluid pressure for obtaining the desired expansion and securing of the cores. Thus, attention is invited to U.S. Pat. Nos. 4,050,643 of Sept. 27, 1977 and 4,147,312 of Apr. 3, 1979. In such patents, the background and state-of-the-art is discussed and the disclosures in such patents, together with other patent mentioned above, are incorporated by reference into this specification.

SUMMARY OF THE INVENTION

The expansible chuck assembly of the instant invention is a mechanically compact mechanism which is disposed on one or both sides of the core between the core and trunions or other support bearing members. Preferably, a chuck is employed on both sides of the core. But, if used only on one side, a truncated conical idler head as disclosed in U.S. Pat. No. 3,753,570 or other idler heads as would occur to one skilled in the art may be used for supporting the other side. The assembly comprises a cylindrical chuck body which has an interior chamber receiving a piston with a piston rod which extends through the end of the cylinder towards the core. The end of the piston rod comprises a tapered arbor against which a plurality of gripping elements bear, such elements being slidably secured on their outboard side to the end of the chuck body by keyways whereby when compressed air moves the piston and piston rod in an inboard direction the gripping elements are expanded against the interior of the core to hold same with a force created by the air pressure force exerted against the piston. When compressed air is applied to the other side of the piston the piston rod together with the arbor are withdrawn outboard relative to the core thus releasing the gripping action on the interior of the core. The gripping elements thus quickly engage, with a charge of compressed air against the piston, the interior of the core and to do so in a manner which meets a predetermined engineered torque capacity. Through the combination of an air piston working in conjunction with the radially placed gripping devices moved by the inclined surface of the tapered arbor, the air charge force is applied to the mechanical advantage of the inclined surface and, therefore, causes the gripping elements to move equal amounts concentrically to engage the web's core.

As the description progresses, it will be appreciated the chuck assembly provides an exceptionally highly selective torque capacity with an unusually uniform concentrical engagement of the core involved. The radially movable engagement elements are readily removed and replaced without tools so the assembly is adapted to accept various sizes of cores with a minimum of time and effort. Moreover, the assembly is disengaged quickly from the core with a further charge of compressed air acting in the same air piston which causes the positive engagement of the gripping elements in the core and the disengagement occurs without jamming or core damage. The combination thus permits a dependable operation which can be repeated many times for winding processes up to maximum winding speeds with differing torque requirements. Vibration of the core when mounted on the chuck assembly is minimal.

Important objects of the invention are: to provide an expansible chuck assembly having the engineered torque capacity and ability to engage concentrically cores for rolls or paper, film, foil, metal sheet coils, textile web material, etc.; to provide a chuck assembly having removable gripping engagement elements which can be replaced with a variety of further similar elements for different core sizes without requiring the chuck body, as such, to be removed from the winding equipment; and to provide an expansible chuck assembly which can be manufactured economically and requires minimum maintenance.

Other objects, adaptabilities and capabilities of the invention will be appreciated by those skilled in the art as the description progresses, reference being had to the accompanying drawings, in which:

DETAILED DESCRIPTION OF THE PREFERRED EMBODIMENTS

Figure 1:
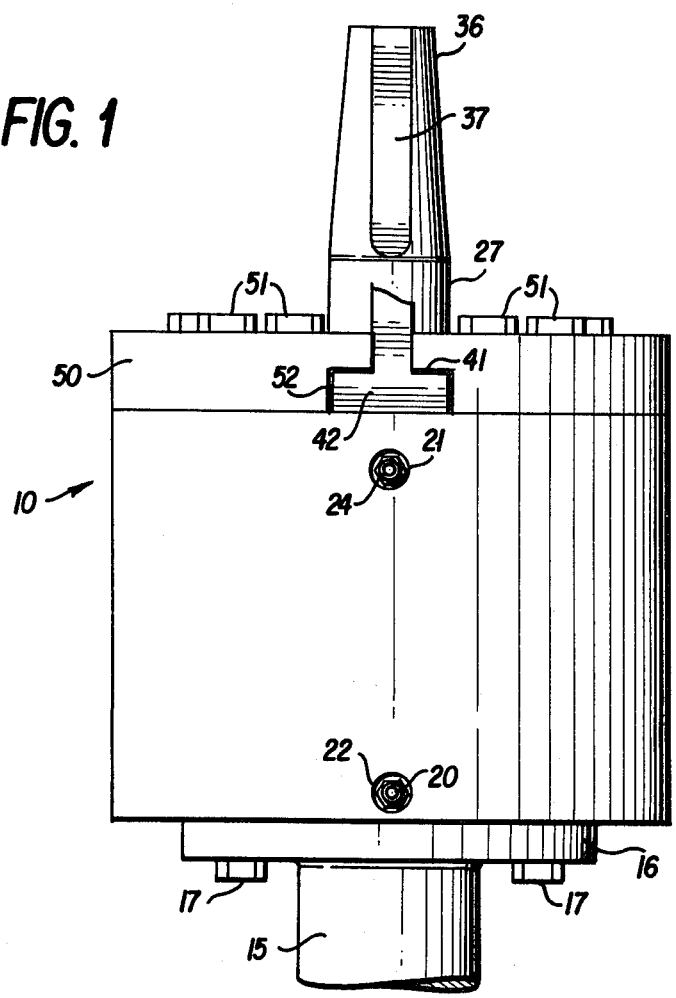
FIG. 1 is a plan view of a chuck assembly in accordance with the invention.
Figure 4:
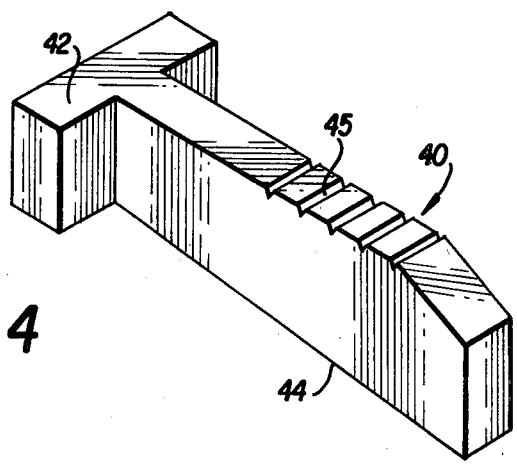
FIG. 4 is a detail perspective view of a gripping member in accordance with the invention.

Referring to the Figures, a cylindrical chuck body designated generally by reference numeral 10 includes a cylinder portion 11, and outboard end plate 12 and an inboard end plate 14. End plates 12 and 14 are threadably received by cylinder portion 11 or are otherwise suitably secured by means of a flange 16 and bolts 17 to the end plate 12. It will be understood trunion 15 may be keyed, if desired, for connection to appropriate driving means for rotating the chuck such as gears, belts or other suitable means.

Cylinder portion 11 is provided with an outboard opening 20 and an inboard opening 21 each of which receive check valves 22 and 24, respectively, such check valves being similar to check valves commonly employed for pneumatic tires of automobiles and which may cooperate with the type of air hose valve used for applying air pressure to pneumatic tires. Conventional regulating valves may be employed to select an appropriate air pressure which is supplied from a conventional pressure tank for compressed air or other appropriate source for compressed air. It will be noted that each check valve 22 and 24 communicates with a chamber 25 in chuck body 10 which is defined by the interior of cylinder portion 11 and the two end plates 12 and 14. Chamber 25 is hermetically sealed, or substantially hermetically sealed, and for this purpose O-rings 28 and 29 or other suitable sealing material are provided.

Chamber 25 which is of cylindrical configuration, receives a piston 26 which hermetically divides chamber 25 and has rigidly connected at its center a piston rod 27 extending normally therefrom in an inboard direction through an aperture 30 which is located centrally in inboard end plate 14. Piston 26 together with piston rod 27 are adapted to be reciprocated horizontally in chamber 25 between end plates 12 and 14. Piston 26 is thus moved in an inboard direction by applying a charge of compressed air to check valve 22 and is returned, moving in an opposite outboard direction by the further application of compressed air to check valve 24. To ensure air pressure applied on one side of chamber 25 to move piston 26 exceeds that in its opposite side, outboard and inboard needle valves 31 and 32 are provided in cylinder portion 11. O-rings 34 and 35, received in grooves in aperture 30, prevent air leakage from chamber 25 outwardly between piston rod 27 and surfaces defining aperture 30.

The inboard end of piston rod 27 is a tapered arbor portion 36 which is provided with a plurality, three in this embodiment of inclined plane wedge surfaces 37 which are displaced by an equal angle relative to each other (120°) about arbor portion 36. Bearing against each surface 37 is a radial gripping element 40. The elements are retained against end plate 14 of chuck body 10 by interlocking keyways and shaft members comprising T-slots 41 and corresponding profiled T-formation end portions 42 of elements 40 which are snugly but slideably received within slots 41. Each gripping element 40 has on its inward side a planar surface 44 which mates with a wedge surface 37. Each gripping element 40 has an outward gripping surface 45 which, with the corresponding portion 42 received in slot 41, extends perpeneicularly to the outboard surface of end plate 14 and parallel to the longitudinal centerline 46 of piston rod 27. Each surface 45 may, if desired, be provided with transverse grooves, as shown, or longitudinal grooves, or knurling or the like to increase its capacity frictionally to engage the interior of a core 54. If desired, surfaces 37 may be curved, convex or concave, as seen in cross-section at a right angle to centerline 46 in which case the mating surfaces of gripping elements 40 are curved in a corresponding manner.

Figure 3:
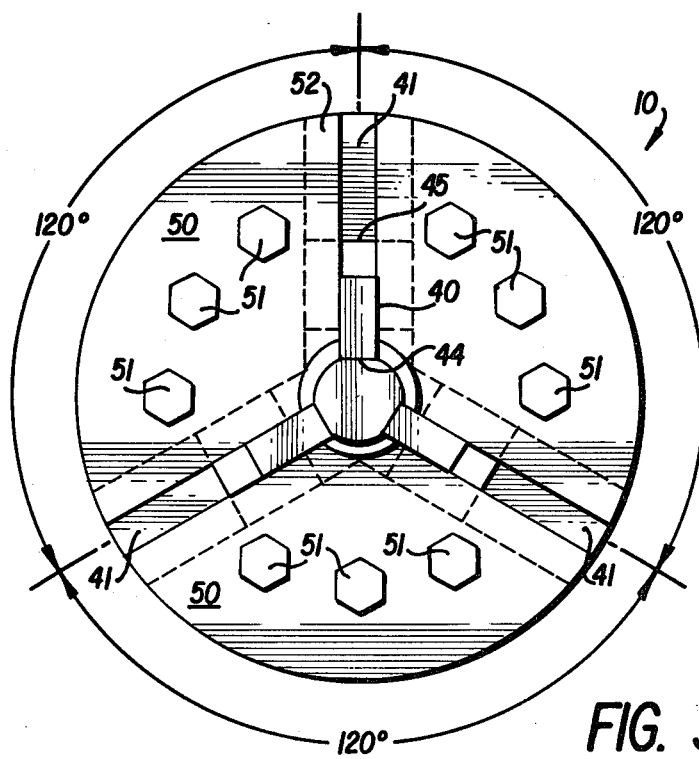
FIG. 3 is a front elevation of the invention.

T-slots 41, which, as seen in FIG. 3, are 120° apart, are defined by the outer surface 47 of end plate 14 and three identical segments 50 which are included in body 10 and are each affixed to end plate 14 by a plurality of bolts 51 or other suitable securing means. Each segment 50 has an inset or channel portion 52 which, with an adjoining segment 50, define T-slots 41 for receiving the T-portions 42.

Surfaces 45 of each gripping element 40 engage in an gripping relationship the internal cylindrical surface of the core 54 as will be disclosed in more detail subsequently. It is to be noted from FIG. 2, the external cylindrical surface of core 54 receives a roll 55 of webbing which may be paper, film, foil, metal sheet coil, textile web material, etc.

The slidable fit of the T-portion 42 within each T-slot 41 is sufficiently snug, whereby gripping elements 40 do not fall therefrom by reason of gravity when they do not bear against the interior surface of core 54 or are otherwise disengaged from core 54. Alternate gripping elements are manufactured for different size cores and they may be readily removed and replaced manually.

A chuck in accordance with the invention is caused to engage core 54 by applying a charge of compressed air to valve 22 moving piston 26 and piston rod 27 in an inboard direction. As rod 27 so moves, the inclined plane wedge surfaces 37, which are mated with the planar surfaces 44 of each gripping element 40, move each gripping element 40 radially outwardly to engage the interior surface of core 54 with a force as determined by the net pressure applied to piston 26. The combination of forces developed by the air pressure in chamber 25 against piston 26 and the inclined mating surfaces thus result in a selected torque capacity as required for the engagement of the chuck to core 54 and to maintain the web of roll 55 in a desired predetermined tension caused by the braking action applied to the web. Because the mating inclined surfaces are identical and equally spaced radially in three places at 120° relative to each other, gripping elements 40 are caused to engage core 54 concentrically. As indicated above, gripping elements 40 are retained by the chuck body 10 through the T-slots 41 defined in its inboard face by end plate 14 and segments 50 and the corresponding T-portions which are on the outboard ends of gripping elements 40.

To change core sizes from, for example, a three inch core to a six inch core, chuck body 10 need not be removed from the winding equipment by disengaging trunion 15; instead only gripping elements 40 need be replaced to accommodate the six inch core. Thus, it will be appreciated gripping elements 40 may be manufactured to any core size which may be reasonably anticipated.

To disengage gripping elements 40 from the interior surface of core 54, a charge of compressed air is applied to valve 24, air having previously been bled by needle valve 31 from the outboard side of chamber 25 (or, optionally, by holding valve 22 open in the absence of a needle valve). This releases the original engagement charge of air and drives the piston 26 together with piston rod 27 in an outboard direction thus disengaging the outward gripping surface 45 of each gripping element 40 from the interior of core 54.

FIGS. 5 through 8 are directed to a preferred embodiment wherein, in effect, segments 50 are integral with and constructed with the same piece of material as end plate 14 which, together, are similarly integral with cylindrical portion 11 of the first embodiment and wherein the grip elements have an outer surface which extends substantially through an arc of 120°. In the further embodiment, the same reference numerals have been applied to a number of components which are the same or essentially the equivalent of elements in the first embodiment having the same reference numeral.

In the further embodiment, the cylindrical chuck body is designated generally by reference numeral 10A. A cylinder part 61 and an end plate 62 of body 10A define the chamber 25. End plate 62 is secured to cylinder part 61 by a plurality of shoulder screws 64 which extend through openings 65 into threaded aligned bores 66 of end portion 62.

Piston 26 is secured to piston rod 27A by a flat head bolt 67 threadably received in a bore 68 which is threaded and has the same longitudinal axis 46 as the axis of piston rod 27A. An O-ring 70 surrounds the bore 68 and bolt 67 to ensure that chamber 25 is hermatically sealed. This result is also contributed to by O-ring 35 which surrounds the piston rod 27A and is received in a groove in the cylinder part 61.

Also to contribute to the hermatic sealing of chamber 25, portion 62 is provided adjacent chamber 25 with a seal plate 71 which is secured thereto by a plurality of flat head bolts 72 received in aligned bores 74 which are threaded and extend through plate 71 into end portion 62.

End portion 62 is secured to a trunion or bearing shaft by threaded openings 75 which extend completely through end portion 62 wherein they are terminated by plate 71. Surrounding the threaded openings 75 is an O-ring 76 received in a groove in end portion 62 and end portion 62 is further sealed relative to the cylinder part 61 by an O-ring 28A which is received in a circular slot provided for such purpose in end portion 62.

It will be noted that as with the previous embodiment the cylindrical part 61 is provided with an outboard opening 20 and an inboard opening 21, each of such openings receiving check valves 22 and 24 respectively for connection to an air hose valve for applying air pressure in chamber 25 for moving piston 26 together with piston rod 27A, depending upon which side of piston 26 air pressure is applied.

Figure 5:
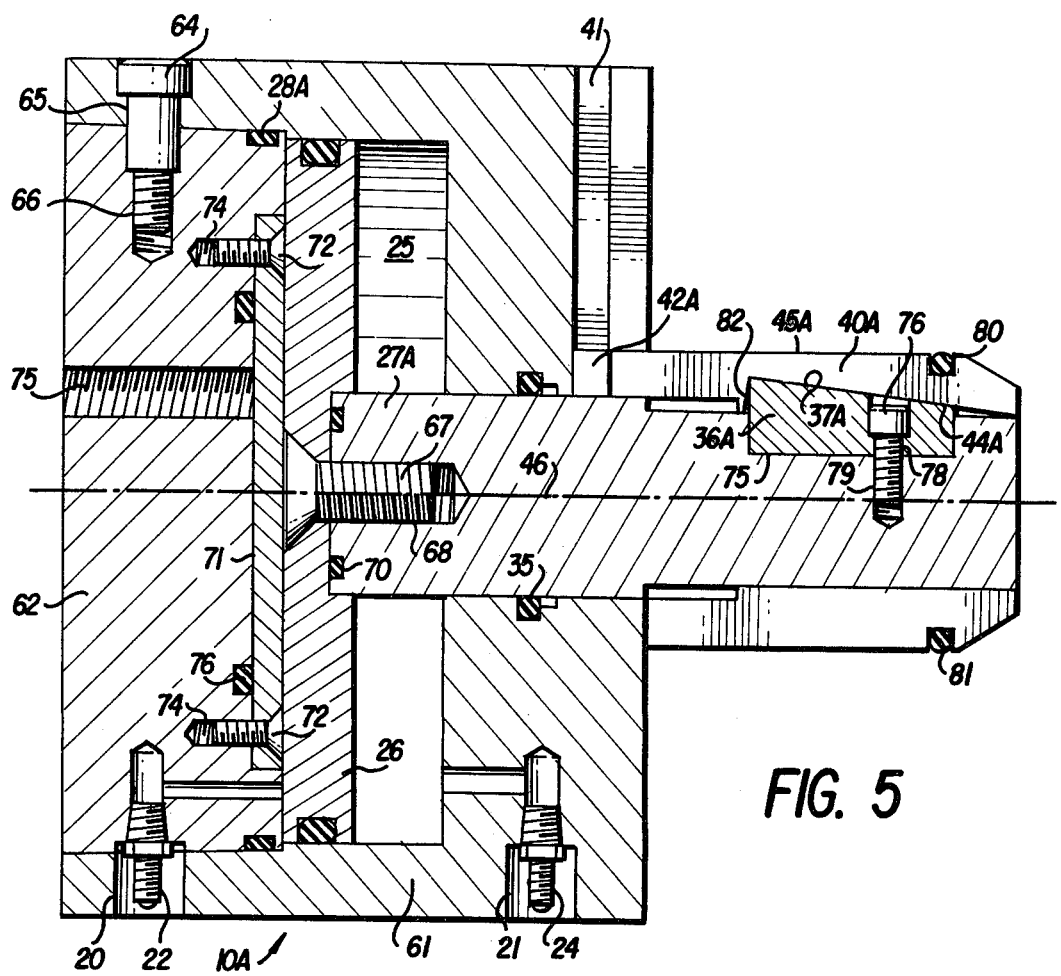
FIG. 5 is a view similar to FIG. 2 showing a further embodiment of the chuck assembly of the invention.
Figure 7:
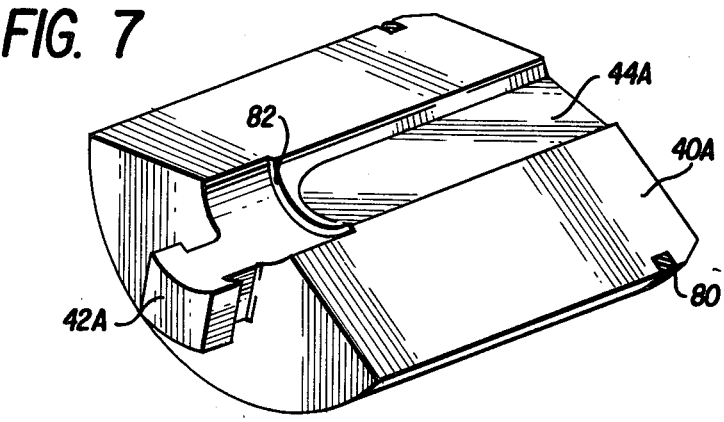
FIG. 7 is a perspective view of the gripping member of the further embodiment.

The inboard part of piston rod 27A is provided with three slots, only one slot 75 being shown in FIG. 5, the three slots being disposed at 120° about centerline 46 in the inboard portion of piston rod 27A. Each slot receives a wedge member 36A which has an inclined plane wedge surface 37A and is secured to rod 27A by a bolt 76 which is threadably received in a bore 78 which is threaded at least in part and is aligned with a bore 79 in wedge member 36A with the head of the bolt 76 being countersunk in bore 78 whereby it is below surface 37A. A gripping element 40A has on its inward side a planar surface 44A which mates with wedge surface 37A.

In this embodiment it will be noted that the gripping element 40A, only one of which is shown in FIG. 5, extends through an arc of about 120° whereby it is roughly pie-shaped as seen in cross section and includes an outer surface 45A which, in this embodiment, is provided with longitudinal grooves and has a profiled T-formation end portion 42A which is received in a slot 41 which is a T-slot. Accordingly, it will be understood that end portions 42A of elements 40A are snugly but slidably received within slots 41.

Although each wedge member 36A is provided with a bolt 76 for securing same to the rod 27A, it will be appreciated that the aligned bores 78 and 79 are off-set longitudinally relative to each other as shown in this embodiment to preclude interference with one another in the vicinity of the centerline 46.

Each gripping element 40A includes a transverse slot 80 which receives an O-ring 81 which serves the purpose of acting as an elastic or resilient member to urge each gripping element 40A towards the centerline 46, the O-ring 81 being, as conventional, composed of an elastic material such as rubber.

Each gripping elements 40A is provided with an internal shoulder 82 which assists in maintaining the position of gripping element 40A relative to wedge member 36A.

It will be appreciated that T-slots 41 are 120° apart and are machined into the inboard end of the chuck body 10A to receive the T-portions 42A of gripping elements 40A.

Figure 2:
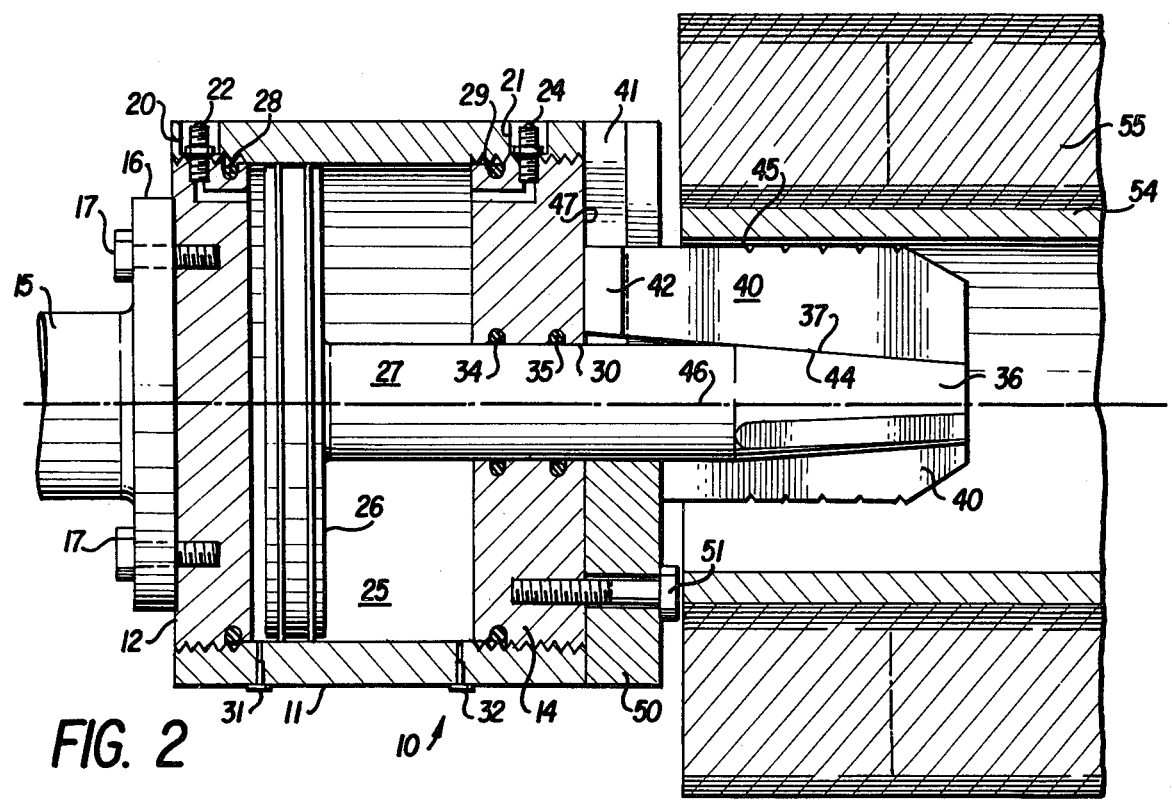
FIG. 2 is a side elevation in section showing the assembly inserted in a core.

The surfaces 45A of each gripping element 40A engage in gripping relationship with the internal cylindrical surface of a core in a manner as shown in FIG. 2 for the previous embodiment except that in this embodiment the gripping surface which engages the internal surface of the core 54 is much larger.

A chuck as shown in the embodiment of FIGS. 5 through 8 is caused to engage a core such as core 54 by applying a charge of air to valve 22, thus moving piston 26 and piston rod 27A in an inboard direction. With such movement of rod 27A, the inclined plane wedge surfaces 37A of each wedge member 36A are mated with the planar surfaces 44A of each gripping element 40A thus moving each of the latter elements radially outwardly to engage the interior surface of the core with a force as determined by the net pressure applied to piston 26. The forces developed by air pressure in chamber 25 against piston 26 in combination with the forces resulting from the inclined mating surfaces provide a torque capacity as desired for engagement of the chuck to the core and as necessary to maintain a web on the roll carried by the core in a desired predetermined tension caused by the braking action applied to the web. With the mating inclined surfaces identical and equally spaced radially in three places 120° relative to each other, gripping elements 40A engage the core concentrically. When it is desired to disengage such core, air is applied to the valve 24 thus causing the rod 27A to move outboard and the resilient force of O-ring 81 keeps the mating surfaces 37A and 44A in contact whereby the effective diameter of the outer surfaces 45A is reduced thereby releasing the core.

In the event that larger gripping elements 40A are desired, the O-ring 81 is removed whereby gripping elements 40A are easily pulled from the T-slots 41 and replaced by different sized gripping elements 40A which, if necessary, may be held together by a somewhat larger O ring 81 which is placed in tension in slot 80. By having removable gripping elements 40A, all standard core sizes may be used with the same chuck body 10A and change-over time is reduced.

With the concentric engagement provided as shown in this embodiment, the frictional engagement with the interior of the core is increased whereby maximum winding speeds are possible with minimum vibration. Moreover, there is a high torque capacity with the equipment as disclosed herein which allows relatively rapid starts and emergency stops.

The chuck assemblies are preferably constructed of heavy alloy steel and it will be noted that with only one internal moving part, wear and maintenance are reduced.

The usual different size gripping elements 40A provided to be interchangeable are for 3 inch, 4 inch, 5 inch and 6 inch internal diameter core sizes. Air pressure is generally available in a general range of 60 to 100 psi. With 3 inch gripping elements at 60 psi, a torque capacity of over 6000 inches/pounds is provided. With gripping elements for 6 inch cores used with air pressure at 100 psi, the torque capacity exceeds 20 thousand inches/pounds. Also it will be understood that the size of the piston is such (about 7 inches in diameter) that up to 2000 pounds of force is provided to engage and disengage the gripping elements 40A. The positive air engagement together with the positive air disengagement reduces jamming and core hang-ups.

It is also important to appreciate that the simplicity of the design provides a chuck assembly which is relatively inexpensive as an initial investment and various gripping elements of different sizes can be purchased as required.

Figure 6:
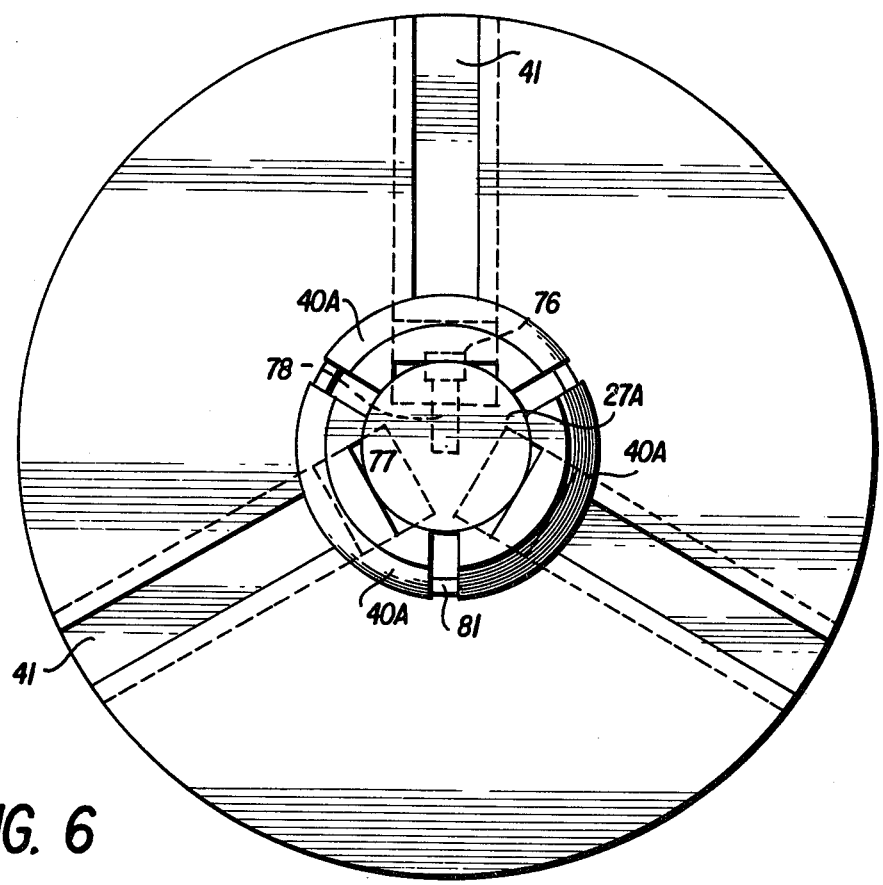
FIG. 6 is a front elevation of the assembly of FIG. 5.
Figure 8:
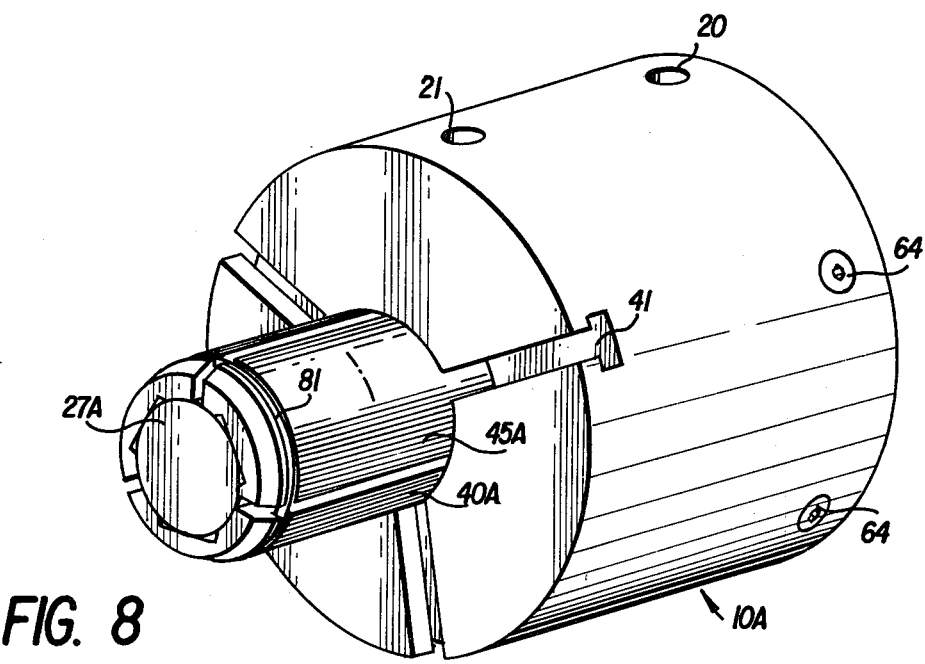
FIG. 8 is a perspective view of the chuck assembly of the further embodiment.

FIGS. 5 and 6 are proportionally closely correct. The overall diameter of the chuck body 10A is 8½ inches. Its overall length is 5⅞ inches with the piston 26 having a thickness of ¾ inches in a chamber which is 1⅝ inches in width whereby movement of the piston is about 0.875 inches. Each gripping element extends outwardly from chuck body 40A 3¾ inches. It is intended that the drawings, particularly FIGS. 5 and 6, be considered more than merely for illustration and generally representing the relationship of the various elements, but drawn to scale with the gripping elements 40A shown in FIGS. 5 and 6 being disposed for cores having a 3 inch internal diameter. Nevertheless, it will be understood that the claims of the invention are not restricted to the exact form of construction, dimensions and proportions as shown in the drawings unless specifically stated.

In view of the foregoing it is to be understood, although preferred embodiments of the invention are described above, the invention is capable of other adaptations and modifications within the scope of the claims which follow. For example, a larger number of gripping elements such as six may be provided, in which case, for the second embodiment, the arc displaced by each gripping element is proportionately reduced. Moreover, other inventive concepts which may be disclosed in the specification or drawings or both which, if not set forth in the claims of this instrument, may be subject matter in applications subsequently filed under appropriate rules and statutes.

Having thus described our invention, what we claim as new and desire to secure by Letters Patent of the United States is:

1. A rotatable expansible chuck assembly for use in web winding and unwinding operations which comprises a body, a hermetically sealed chamber in said body, a piston in said chamber dividing said chamber into two hermetically sealed spaces, fluid pressure check and bleed valves mounted on said body connected to said chamber through said body on opposite sides of said piston into respective said spaces, a piston rod connected to said piston extending therefrom through an aperture in said body, a plurality of inclined plane wedge surfaces provided on said piston rod where it extends out of said aperture, a plurality of gripping means, each said gripping means having an inner surface engaging a corresponding said wedge surface and an outer surface to receive a core for a roll of web material to be wound or unwound, and a slidable connection between each said gripping means and said body whereby each said gripping means is movable generally radially relative to said body in response to movement of said piston rod, resilient means retaining said gripping means in said body which is so arranged and constructed that said gripping means are readily removable from said body and replaceable by other gripping means, said valves, said chamber, said piston and said piston rod being so constructed and arranged that when the outer surface of said gripping means is engaging a core of material being wound or unwound under a predetermined tension the fluid under pressure in said space on the side of said piston urging said gripping means into engagement with said core is isolated from any other fluid pressure sources, the fluid in the other said space is in communication via its bleed valve with the atmosphere and said engagement due to the net pressure against said piston is continually sufficient to maintain said tension irrespective of minor distortions due to movement or stretching of said core.

2. An assembly in accordance with claim 1, wherein said body is of a cylindrical configuration, with its longitudinal axis coincident with the axis of rotation of the assembly.

3. An assembly in accordance with claim 1, wherein said valves are adapted to receive compressed air.

4. An assembly in accordance with claim 1, wherein there are three gripping means, said gripping means each being displaced an equal number of degrees relative to each other.

5. An assembly in accordance with claim 1, wherein said slidable connection comprises keyways in said body, said gripping means including profiled outboard edges adapted to be snugly received and held in slideable engagement by said keyways.

6. An assembly in accordance with claim 5, wherein said keyways comprise T-slots.

7. An assembly in accordance with claim 1, wherein said body is affixed on its outboard side to means for connection to means for rotating the assembly.

8. A rotatable self-contained expansible check assembly for use in web winding and unwinding operations, which comprises a body, a hermetically sealed chamber having a cylindrical configuration defined within said body, a piston movably received in said chamber and dividing said chamber into two hermetically sealed spaces, fluid pressure valves comprising check valves adapted to receive an expansible fluid under pressure from a readily detachable fluid pressure source and manually operated bleed valves mounted on said body and connected to said chamber through said body on opposite sides of each piston in each respective said space, a piston rod connected to said piston which extends therefrom through an aperture in said body, an inclined arbor portion provided on the inboard end of said piston rod where it extends out of said aperture, a plurality of gripping means, each said gripping means having an inner surface engaging a corresponding surface on said arbor portion and an outer gripping surface to engage the interior surface of core for a roll for sheet material to be wound or unwound under predetermined tension, a slidable connection between each said gripping means and said body whereby each said gripping means is movable generally radially relative to said body in response to movement of said piston rod by said piston caused by fluid under pressure in one of said spaces, said fluid under pressure isolated in one of said spaces being the sole means for moving said piston when said assembly is rotated with the other said space then being maintained at ambient pressure through its respective bleed valve, and resilient means retaining each said gripping means in its operative position in said body, said retaining means being so contructed and arranged that said gripping means can be readily removed from said body and replaced by other gripping means.

9. An assembly in accordance with claim 8, wherein said check valves are adapted to receive fluid consisting of compressed air.

10. An assembly in accordance with claim 9, wherein said bleed valves provide for selectively relieving air pressure on each side of said piston.

11. An assembly in accordance with claim 8, wherein three gripping means are provided, each said gripping means and being spaced around the axis of rotation of the assembly by 120°.

12. An assembly in accordance with claim 8, wherein said slidable connection comprises slots in said body and corresponding profiled means at the edges of said gripping means.

13. An assembly in accordance with claim 12, wherein said slots are T-slots and said profiled means on the edges of said gripping means have T-shaped configurations as seen in cross-section.

14. An assembly in accordance with claim 8, wherein three gripping means are provided, each gripping means being readily removable from said body and including a gripping surface coinciding with a cylindrical surface over an arc of about 120°.

* * * * *